United States Patent Office  3,378,375
Patented Apr. 16, 1968

3,378,375
METHOD OF PREPARING ACIDIFIED DAIRY PRODUCTS
Lawrence L. Little, Creve Coeur, Mo., assignor to The Battelle Development Corporation, Columbus, Ohio, a corporation of Delaware
No Drawing. Continuation-in-part of application Ser. No. 173,833, Feb. 16, 1962. This application June 3, 1965, Ser. No. 461,194
3 Claims. (Cl. 99—59)

This invention relates to improvements in the production of dairy products and relates in particular to a new and novel method for producing acidified milk.

This application is a continuation-in-part of United States patent application Ser. No. 173,833, filed Feb. 16, 1962 now abandoned, entitled, "Process for Making Acidified Dairy Products and Products Therefrom," which in turn is a continuation-in-part of U.S. patent application Ser. No. 104,233, filed Apr. 20, 1961, entitled "Pasteurized Non-Cultured Liquid and Plastic Milk Products and Process for Making Same," now abandoned.

In the manufacture of acidified milk products, such as buttermilk, cottage cheese, and sour cream, it has long been the practice to inoculate milk with mixed cultures of lactic acid-forming bacteria which ferment the milk until the desired acidity is achieved. Buttermilk now produced commercially by this process is known as "cultured" buttermilk. The word "cultured" is used generically to describe any dairy product acidified by a process involving the use of bacteria in one of the processing steps. Of the cultured acidified dairy products available today, buttermilk, sour cream, and cottage cheese are the more common and, thus, are the most familiar to the dairy industry and the consumer.

The preparation of a cultured product usually involves the steps of cooling pasteurized whole milk, skim milk, or cream to a temperature of between about 70° F. and 90° F. and adding thereto about 1 to 5 percent by weight of a bacterial starter culture. The starter culture comprises a mixture of several lactic-acid-producing strains of bacteria, together with flavor- and aroma-producing bacteria. This starter culture is thoroughly mixed with the milk or cream, and the mixture is allowed to stand undisturbed for a period of from 4 to 24 hours. At the end of the standing period the pH of the milk or cream is in the range of from about 4.0 to 4.9. Subsequent steps in the process vary somewhat, depending on the nature of the product. In the case of the fermentation the cultured buttermilk is agitated or churned vigorously to break up the coagulation of casein, resulting from the acid developed during fermentation and to produce a smooth-bodied, homogeneous, viscous liquid. The buttermilk is then cooled to about 38° F. and bottled.

While the present process for producing cultured dairy products using prepared starter cultures represents an advance in the at over previous practices, it nevertheless has numerous shortcomings. Fermentation by a mixed culture of bacteria is difficult to control accurately. If the lactic-acid-producing bacteria are too active, they tend to kill off the flavor-producing organisms. If the lactic acid production is too slow, the flavor bacteria do not function effectively and the product will be lacking in both flavor and acidity. As a result, even with the best quality control there are occasions when the acid development is too high or too low, resulting in a product with poor flavor, making the product tend to vary from day to day. In the case of cottage cheese the texture of the curd is very sensitive to the pH at which the curd is cut and variations in the ability of a culture to produce acid must be watched closely. Even when the lactic-acid-producing bacteria function perfectly, the cheese maker may mis-judge the rate of acid production and cut the curd too soon or too late, resulting in a poor quality cottage cheese. The presence in the milk being treated of minute traces of penicillin or other antibiotics used in treating bovine mastitis exert a serious inhibiting action on the entire bacterial culture and can be disastrous to the final product. In addition, lactic-acid-forming abcteria are subject to attack by bacteriophage which results in lysis of these cultures. Consequently, a mixture of phase-resistant strains muse be used, and although the strains are alternated regularly, bacteriophage still causes many culture failures. The fermentation process requires a long time period, i.e., 4 to 24 hours, from start to finish. Important equipment is monopolized by the fermenting products until the desired degree of acidity is attained. Because of this long period of standing, batch-type methods must be used in producing cultured products. The process is not amenable to continuous operation and automation techniques. Further, bacterial starter cultures are cumbersome and costly to maintain. However, a producer of larger quantities of cultured dairy products is required to maintain his own starter cultures at great expense if he hopes to maintain any control whatsoever over quality and consistency in his final products.

Thus, there has been a need in the art for a new process that will circumvent either all or some of the aforementioned difficulties encountered in the fermentation process.

To date, attempts to replace bacterial fermentation have been only partially successful. It would appear obvious to merely add lactic acid, or some edible acid, to milk as a substitute for the acid provided by the natural culture process. However, when this is attempted casein agglomeration is invariably permature, resulting in the production of an uneven curd of varying quality. It is speculated that this phenomena is attributable at least in part to the fact that when such an acid is added in a concentrated form portions of the milk are over acidified causing premature precipitation in these portions while other portions of the milk which are the last to be acidified form a large hard coarse curd. The result is an uneven curd formation of poor texture and quality. Dairy products made from such a curd are inferior in quality. The reason a more even and desired uniform casein agglomeration occurs when bacteria cultures are employed is that the acid is formed slowly, uniformly, and in situ in the milk so that the acidity of the milk lowers slowly and uniformly. Under these conditions, casein agglomeration and curd formation take place uniformly to form a particularly desirable gel-like curd consisting of calcium caseinate, fat and milk protein.

Many attempts have been made to introduce acids into milk and dairy products in a manner to duplicate the cultured products. Concentrated acids may be added very slowly and under proper conditions of temperature and agitation a somewhat satisfactory curd can be obtained. However, a consistently uniform product is difficult to obtain by these means. Additionally, the time requirements detract from the attractiveness of such procedures.

It is also possible to add such acids in a diluted form to avoid premature precipitation. However, to avoid an uneven and thus undesirable curd the degree of dilution necessary is excessive and results in a thin acidified milk product containing undesirable quantities of water.

When milk is acidified slowly, over a period of several hours, by the process of culturing, the milk proteins coagulate in a highly hydrated state, forming a smooth and extremely firm rigid gel. This property is vitally important in obtaining the firm, heavy body desired in sour cream, and the thick viscous liquid or semiliquid that results when the coagulated milk is agitated in producing buttermilk. A highly hydrated milk protein is essential in obtaining these characteristics.

When milk is coagulated by artificial acidification, the proteins are in a low state of hydration and even if the formation of hard, lumpy curd is avoided, the product is much too thin and fluid to be acceptable commercially. For example, when a fairly dilute solution of acid is used in artificial acidification and the dilute acid is added very slowly, with vigorous and efficient agitation, premature and lumpy curd formation may be avoided, but the proteins coagulate in a state of low hydration and the resulting sour cream is a thin semi-solid and the buttermilk is thin and watery.

I have discovered that a satisfactory acidified milk product may be obtained by direct addition of concentrated edible acid if a colloid-forming material is added to the milk prior to the acid addition.

It is, therefore, the object of the present invention to provide a method for the artificial acidification of milk that will provide a satisfactory acidified milk product that is substantially equivalent to cultured milk products.

It is also the object of the present invention to provide a method for adding a concentrated edible acid to milk without causing premature and uneven curd formation.

A still further object of the present invention is to provide a method whereby a colloid-forming material is added to milk prior to the acid addition when making an acidified milk product so that premature curdling does not take place.

In general, the present invention is the discovery that an acidified milk product of uniform curd that is substantially equivalent to natural "cultured" milk products can be obtained by the direct addition of one or more concentrated acids if a stabilizer consisting of a material that is capable of forming a colloidal suspension within the milk is first added to the milk.

The conventional function of such stabilizers when added to cultured dairy products is to prevent the separation of whey from the bulk of the acidified milk product. A stabilizer may be incorporated in cream during conventional processing of cultured sour cream. Such stabilizing additions are effective in counteracting the problem of syneresis (curd contraction and whey exudation). Stabilizer additions to cultured products have no discernible effects on the texture or quality of the curd.

Stabilizers are also used in other cultured products such as buttermilk and cream cheese to counteract the problem of syneresis that occurs slowly while the cultured product is held in storage. In each application such stabilizers have no effect on the type of coagulation and degree of hydration of the proteins effected by the process.

Stabilizers such as hydrophilic colloids are occasionally added to milk to maintain a suspension or prevent a settling out of some additives. For example, such additions may be made to chocolate milk to prevent chocolate particles from agglomerating or settling out. Similarly such additions may be made to fruit-flavored milk drinks where fresh fruit juices are added to milk. The colloid addition prevents agglomeration and settling of fruit particles. Prior to the present invention hydrophilic colloids or stabilizers had not been added to milk prior to acidification, since the formation of a curd is not the equivalent of particle settling or agglomeration and the effect of such stabilizers in avoiding premature curd formation, and increasing the hydration of the protein is unexpected and surprising.

The amount of stabilizer or colloid added is dependent to a large extent on the product being made and the expectant degree of acidification. I have found the preferred range to be from about 0.05 to 1.00 percent by weight. At concentrations less than about 0.05 percent the concentrated acid must be added very slowly to avoid premature precipitation of fine casein flakes, consequently largely defeating the reasons for the stabilizer addition. At greater concentrations than about 1.00 percent the milk tends to gell and become too thick for practical applications.

As set forth above, hydrophilic colloids when employed as the stabilizer are preferred. Examples of suitable colloids applicable to the process of the present invention include gelatin, casein, flour, tapioca flour, increased non-fat milk solids, agar, locus bean gum, guar gum, cellulose gum (particularly carboxymethyl cellulose and methyl cellulose), Danish agar, carrageenan, gum tragacanth, and gum arabic. Additional colloid-forming materials found to be particularly satisfactory stabilizers are water-dispersable lecithin, and gelatin hydrolyzate. Thus, a wide variety of colloid-forming materials can be used, in fact, any edible colloid-forming material may be successfully employed within the preferred range of 0.05 to 1.00 percent by weight to contribute a degree of desired stabilizing effect and enhance the product when concentrated edible acids are employed to acidify milk. The choice of stabilizer depends upon the relative characteristics of viscosity, spreadability, and the like properties desired in the finished product which, in turn, is indicated by consumer preference in various marketing areas. For example, locust bean gum, guar gum, casein, and mixtures thereof are preferred in preparing a sour cream product, while Danish agar, locust bean gum, guar gum, or mixtures thereof are preferred in preparing a buttermilk product.

It is important that the stabilizer be thoroughly mixed and uniformly dispersed throughout the milk or cream prior to the acid addition. Thus, while the stabilizer is being added, the milk or cream is preferably agitated. Sufficient time should be allowed for the stabilizing material to become thoroughly and uniformly dispersed in the milk.

After the stabilizer has been added to the milk or cream, it may be pasturized in the conventional manner. The pasteurization temperatures employed in the preparation of the milk or cream prior to acidification are those conventionally used for this purpose, and preferably range between about 143° F. and about 300° F.

If desired, the pasteurization step may be followed by homogenization treatment in conventional manner. Cultured sour cream is generally homogenized. Homogenization has no adverse effect on the practicing of this process.

Following pasturization and, optionally, homogenization, the milk or cream is cooled to a temperature ranging from about 35° F. to about 110° F., depending upon the types of milk product being prepared, and is ready for the acidification step. Any conventional cooling method may be employed. Caution, of course, must be exercised not to freeze the milk, since milk once frozen tends to be unstable, i.e., the casein becomes dehydrated and flocculates.

Stabilized and pasturized, milk or cream, at a temperature between its freezing temperature and about 110° F. is acidified by adding thereto, with agitation, a sufficient amount of an edible acid to reduce the pH of the milk or cream to a value between about 3.7 and about 5.0. The acid may be added as a liquid or a solid and any means of adding such materials may be employed. Further, the edible acid added can be either organic or inorganic, from a chemical classification standpoint. Since a foodstuff is prepared, it is important that the acid employed be edible. It is also desirable that the edible acid used impart tartness and flavor to the product similar to that found in the analogous cultured products. Thus, while some edible acids would work in the process, the end product might have a flavor that would be different from the analogous cultured product. While this flavor may be different, there may be many people who would find it preferable. Among the edible acids that provide the degree of tartness and flavor associated with cultured products are the following: citric acid, lactic acid, tartaric acid, adipic acid, fumaric acid, malic acid, succinic acid, hydrochloric acid, orthophosphoric acid, and pyrophosphoric acid. Of course, lactic acid is preferred for most applications, since it is the acid produced by the bacteria used in the cultured process. On the other hand, citric acid or malic acid is more suitable for some varieties of the products, since it appears to impart more tartness to the product. Again, in practising this process, the acid is added in powdered crystalline form, or as an aqueous solution of the acid. In the case of lactic acid, the commercially available 85 percent food grade has been found to be very effective. While the general pH range for the products is about 3.7 to about 5.0 best results are obtained when the pH is in the range of about 4.0 to about 4.9.

As stated above, the use of concentrated acids avoids undue dilution of the acidified milk product. Organic acids, such as citric and lactic, are relatively weak acids as compared to the mineral acids so that it is particularly necessary that those acids be utilized in a concentrated form. Commercially pure organic acids, such as citric and malic, are in a crsytalline form. Homogeneous and uniform mixtures of acid and milk are more quickly and efficiently obtained if the acid is added in liquid form so that it is sometimes desirable to dissolve the organic acid crystals in a limited quantity of water prior to making the acid addition to milk. For example, one part (by weight) of acid crystals to two parts water may be combined to effect a total acid addition of about 2 percent by weight of the milk. Whether the acid is organic or mineral, to avoid dilution it is preferred that the total acid addition does not exceed about 5 percent, by weight, of the milk.

Fruit juices such as orange or lemon juices and including concentrates of such juices, though they contain citric acid, do not constitute a suitable substitute for the acid addition of the present process. Although the pH of fresh and concentrated fruit juices is lower than 3.7–5.0 so that it is possible to add such juices to milk in quantities to lower the pH to within the desired level, the acid concentration is insufficient to acidify the milk to form the desired agglomeration. Fresh orange juice has about 0.72 percent acid calculated as citric acid. Adding a very mildly acidic substance such as orange juice is somewhat similar to biological culturing in that the acid is added slowly minimizing premature curd formation. However, the great dilution caused by acidifying with such a weak acid solution results in a product other than a marketable sour cream, cottage cheese, buttermilk or other acidified milk products. Such dilution may result in a product that is more accurately described as a milk-flavored fruit drink than a fruit-flavored mlik drink.

As stated above, the acid addition of the present process is preferably made to the stabilized milk while the milk is at a temperature within the broad temperature range of from about 31° F. to about 110° F. Casein agglomeration or curd formation tends to occur prematurely and in an unstable and dehydrated form when acids are added to milk at high temperatures, above about 110° F., in spite of the presence of a stabilizing material. Milk tends to freeze at temperatures below about 31° F.

When the acid is added slowly and uniformly, as where it is provided by means of "culturing," when the acidity reaches or falls below the isoelectric point of the milk being treated the casein agglomerates uniformly to produce the desired highly hydrated gelatinous curd of superior texture and quality. Where raw concentrated acid is added to milk before uniform acidity can be achieved, portions of the casein precipitates prematurely and an uneven undesirable dehydrated type of curd results. I find the presence of a colloid does prohibit casein agglomeration but instead delays premature agglomeration so that the acidity of the milk can be made to uniformly reach or fall below the isoelectric point and the desired protein hydration and curd texture characteristics can be attained.

The extent of the delay in casein coagulaton brought about by the presence of the colloid varies with the product. With sour cream, the casein coagulation is delayed only momentarily, until the acid becomes fairly well mixed with the cream. Then agglomeration takes place very quickly, forming a highly hydrated, soft agglomeration that appears to re-disperse as agitation is continued. After a few minutes of agitation, the lumps of agglomerated casein disappear and the product becomes very smooth and viscous. At this point the sour cream is packaged and refrigerated. After a few hours in the refrigerator, the fat solidifies and the product assumes the very firm, heavy, plastic body characteristic of cultured sour cream.

In the case of buttermilk, casein coagulation is delayed for from several minutes to several hours. The acid is added, sufficient to reduce the pH to the desired range of 4.0 to 4.9. The product thickens slightly but there is no visible coagulation. At this point the product is bottled and stored under refrigeration. With a few hours the casein coagulates in the form of a highly hydrated, very soft gel, which breaks up as the product is poured from the bottle. The buttermilk will have the high viscosity and smooth texture of cultured buttermilk that has been allowed to coagulate and subsequently agitated to give a viscous, smooth textured liquid or semisolid.

With cottage cheese, it is essential that coagulation be delayed after acidification to pH 4.4–4.9 until the milk can be pumped into a cheese vat and the milk comes to a state of complete immobility. The coagulation takes place while the milk is in the quiescent state, and forms a smooth firm coagulation comparable to milk that has been acidified by culturing.

In each of the above applications, the application of the colloid is essential in delaying, modifying the size and character of the agglomerated particles, or re-dispersing the particles to bring about the desired effects.

The degree of acidity at the isoelectric point measured as hydrogen potential (pH) is generally regarded to be about 4.7, however, the isoelectric point is not exact and varies in accordance with temperature and the milk being treated so that uniform agglomeration may take place within a pH range of from about 3.7 to 5.0 although such agglomeration most generally takes place within the pH range of about 4.0 to 4.7.

Where it is desired to increase the viscosity of the products prepared by this process or counteract the delayed coagulation by the colloid, there can also be added, preferably with the acid, a proteolytic enzyme in a relatively small amount. Enzymes, such as rennet or pepsin, are suitable. When rennet is used, only about 0.1 to about 5 cc. of commercial solution per 100 gallons of milk or cream is needed. The use of a proteolytic enzyme causes an increase in the sensitivity of milk protein to calcium resulting in increased viscosity and increased coagulation. The amount of the viscosity increase and the extent of the coagulation can be regulated quite accurately to the desired degree by (1) varying the amount of enzyme used (increasing it increases the viscosity and amount of coagulation and vice versa); (2) varying the pasteurization temperature (temperatures above about 145° F. increase the viscosity and amount of coagulation); (3) adding polyvalent cations, such as calcium (in the form of calcium chloride), increases the viscosity and amount of coagulation; and (4) adding polyvalent anions, for example phosphate ions in the form of sodium dihydrogen phosphate, decreases the viscosity and amount of coagulation.

Where it is desired that the taste of the final product closely resemble the taste of the analogous product prepared by the fermentation method, it may be necessary to add as a flavoring agent, along with acidification, a small amount of a flavoring agent such as starter distillate. Starter distillate is a standard commercial product which is widely used by dairy product manufacturers to add flavor to butter, margarine, and cheese, and to fortify the flavor of cultured buttermilk and other dairy products. Starter distillate is made by culturing a buttermilk starter to a rich flavor and aroma, and then distilling the volatile flavor constituents from the product with steam under very accurately controlled conditions. Using a standard commercial single-strength starter distillate, the desired flavor effect is achieved when it reaches a concentration of about 0.50 per cent by weight of the milk or cream.

In lieu of starter distillate, the chief component or components may be added in their pure form. Diacetyl is the chief flavor component of starter distillate, and diacetyl may be added alone, along with the acid, to achieve a concentration of about 10 to 1500 parts per million in the finished products. Other starter distillate components that may be added are acetic acid, butyric acid, propionic acid, etc. In addition, artificial flavoring materials may be used in appropriate amounts to supplement or replace the starter distillate components entirely.

Other conventional flavoring additives may also be added at this time. Many dairies add butter flakes or granules to their buttermilk product. The butter granules or other flavor-improving agents may be added by any of the techniques presently employed for this purpose.

Where it is desired to more closely resemble the flavor of an analgous cultured product, it is also necessary to add carbon dioxide to the product. Carbon dioxide is produce by bacteria in the fermentation method. It is generally known that carbon dioxide is produced by the flavor-producing bacteria, but it has not been recognized that the carbon dioxide itself is an essential constituent of the complex flavor components of a product of this type. Thus, where carbonation of the product is desired, it has been found necessary to bring the carbon dioxide concentration in the product to the range of about 100 to 3,000 parts per million. While it has been found that a carbon dioxide content of about 1500 parts per million enhances the flavor of sour cream, taste panel results have indicated that carbon dioxide is not essential to prepare sour cream that meets with high taste-panel appoval. In the case of buttermilk, it appears that carbonation is necessary to achieve better taste-panel results. When carbon dioxide, 500 to 3,000 parts per million, is added to buttermilk prepared by this direct acid addition process, there is imparted to the buttermilk a full and mellow flavor fully equal to that of the best buttermilk produced by the fermentation process. Conventional carbonation techniques may be employed for adding the carbon dioxide. For example, it may be added by direct carbonation of the acidified milk, or by addition of a salt which will liberate carbon dioxide when in contact with an acid, such as, calcium carbonate or sodium bicarbonate.

The product is now ready for packaging. Conventional packaging equipment and containers may be employed. After packaging, the product is held under refrigeration until consumed. Products made by this process have a very low bacterial count, of the order of pasteurized milk or cream, which usually is less than 30,000 per cc., as contrasted with cultured products which usually have a bacterial count of several million per cc.

In the above discussion, the process and products therefrom were described in general terms. There are some products that are particularly well suited to preparation by this process. For example, a product superior and analogous to cultured sour cream can be prepared. In processing a sour-cream type product by this process, as compared to the fermentation method, (1) more accurate control over the texture and spreadability of the sour cream is possible; (2) exact control of acidity can be maintained; (3) the product can be pumped by conventional techniques into the final package. Cultured sour cream cannot be agitated or pumped after it is cultured, without excessive loss of viscosity and danger of whey separation; and (4) the cream can be pasteurized and cooled by HTST (High Temperature Short Time) methods giving almost instantaneous pasteurization and cooling, with considerable savings in processing time, man hours, steam, and refrigeration. High temperature short time pasteurization is not suitable for cream that is to be cultured.

In the fermentation process, cream is inoculated with a stirrer culture of bacteria, and then cultured in 10 gallon cans by holding at about 72° F. for about 12 to 24 hours to permit fermentation to occur. It is then dumped by hand into a filling machine and packaged. It is obvious that this process does not permit accurate and effective quality control. By the process of this invention, a stabilizer is added, under agitation, to cream. The cream used may contain the conventional 18 percent butterfat or a so-called half-and-half (milk-cream) may be used, which contains about 10–12 percent butterfat. The cream and stabilizer mixture is then pasteurized and homogenized by conventional techniques. Next, the mixture is cooled to about 50–70° F. Edible acid is added until a pH of about 4.40 is reached. Starter distillate or other flavoring, if desired, is then added along with the acid. If desired, the product can also be carbonated at this time. As pointed out above, while carbonation is not necessary to achieve a product of good taste and flavor, these properties are enhanced by a carbon dioxide content of approximately 300–1500 parts per million. The product is then packaged and stored at 40° F. The processing time to prepare this product is of the order of only one-half to three-quarters of an hour, and may be produced continuously, with a high degree of automation.

The procedure for preparing a product analogous to cultured buttermilk involves the addition of a stabilizer to the skim milk. After pasteurization, the mixture is cooled to about 40° F. Edible acid is added until the desired pH is achieved and starter distillate or other flavoring is added until the flavor is suitable. To achieve the desired body in the final product, rennet, or commercially available cottage cheese coagulator, a proteolytic enzyme may also be added. The product is carbonated to a $CO_2$ content of approximately 500–1500 parts per million. After packaging, the product is stored at 38 to 40° F.

Cottage cheese is conventionally made by (1) adding a starter culture of bacteria and rennet extract to skim milk; (2) allowing it to set at 70 to 90° F. for 4 to 16 hours until the pH reaches about 4.7; (3) cutting the coagulated milk or curd into ¼-inch to 1-inch cubes; (4) heating the coagulated milk slowly to about 120 to 150° F. as need to firm the curd, and (5) draining, washing, creaming (if desired), and packaging the curd. It has become common practice to add either rennet or calcium chloride or both to the milk to firm up the curd and counteract the shattering of the cubes, which normally occurs in the cutting and the early stages of cooking. The fermentation method of producing cottage cheese has the disadvantage that the amount of acid produced by bacterial action varies enough to introduce unpredictable variations in the cutting time, which either results in cutting the cheese too soon, thereby producing an inferior quality of cottage cheese, or waiting for the proper cutting time and thereby extending the time required for the process. The process of this invention may be advantageously used in preparing a cottage-cheese type product. It permits the acidity to be standardized precisely to the proper pH (4.6 to 4.8) and the rennet or calcium chloride additions to be made in the precise amounts required. This enables the curd to be cut as soon as a firm coagulation occurs and, thus, removes the uncertainties and hazards heretofore involved in arriving at the proper acidity and time to cut the curd. It reduces the set time from the customary 4 to 16 hours, to the relatively short time of one-half to one hour, depending upon the temperature at which the milk was set. This considerably shorter processing time greatly increases the capacity of the production equipment.

The following examples are intended to more specifically illustrate the process of this invention and the products resulting therefrom. While these examples are intended to be illustrative, they are not intended to establish limitations of the invention.

Example 1.—Noncultured buttermilk

To 100 pounds of cold raw skim milk, add:

| | Pounds |
|---|---|
| Salt | 0.20 |
| Locust bean gum | 0.15 |

Premix, and sprinkle into the cold milk slowly at the point of greatest agitation.

Allow a few minutes for the stabilizing agents to be dispersed, then pasteurized at 143° to 300° F., and cool to 35–80° F. While agitating vigorously, slowly add:

| | Pounds |
|---|---|
| Starter distillate | 0.30 |
| Citric acid, hydrous crystals (dissolved in equal amount of water) | 0.60 |

After the acid is thoroughly mixed with the milk, butter granules may be formed in the product by churning or, if desired, butter flakes may be added by any of the methods commonly employed for cultured buttermilk. The product is then bottled and held under refrigeration until consumed.

Example 2.—Carbonated noncultured buttermilk

To 100 pounds of cold milk containing 1% fat, add:

| | Pounds |
|---|---|
| Salt | 0.20 |
| Guar gum | 0.20 |

Premix, and sprinkle into the cold milk slowly at the point of greatest agitation.

Allow a few minutes for the stabilizing agents to become dispersed, then pasteurize in the usual way, and cool the milk to 35–80° F., and slowly add while agitating:

| | | |
|---|---|---|
| Sodium bicarbonate | pound | 0.20 |
| Rennet | cc | 0.10 |
| Starter distillate | pound | 0.25 |
| Malic acid, hydrous crystals (dissolved in equal amount of water) | do | 0.35 |
| Concentrated hydrochloric acid | do | 0.35 |

After the acid is thoroughly mixed with the milk, the product is bottled and held under refrigeration until consumed. The sodium bicarbonate will provide about 800 p.p.m. of $CO_2$ in the buttermilk. This amount may be increased or decreased, as desired.

Example 3.—Noncultured buttermilk

To 100 pounds of cold raw skim milk, containing about 0.10 to 1.0% fat, and about 8.5 to 11.5% milk solids not fat, add:

| | Pounds |
|---|---|
| Salt | 0.25 |
| Danish agar | 0.10 |

Premix and sprinkle into the cold milk slowly at the point of greatest agitation.

Allow a few minutes for the stabilizing agents to become dispersed, then heat to 180° F. or higher, and cool to about 80° F. or below. While agitating vigorously, slowly add:

| | Pounds |
|---|---|
| Starter distillate | 0.35 |
| Citric acid crystals, dissolved in an equal amount of water | 0.60 |

After these ingredients are thoroughly mixed, add 100 to 3000 parts per million of $CO_2$ to the product by dissolving $CO_2$ gas in the product by any of the conventional methods of carbonating a liquid product.

Example 4.—Noncultured sour cream

To 100 pounds of cold raw cream (18% fat or over) add:

| | Pounds |
|---|---|
| Guar gum | 0.25 |
| Tapioca flour | 1.00 |

Premix, and sprinkle slowly into the agitated cream at point of greatest agitation.

Allow a few minutes for the stabilizing agents to become dispersed, then pasteurize in the usual way, homogenize at about 1000–3000 pounds pressure and finally cool to 100° F. or lower. While agitating the cooled product, slowly add:

| | Pounds |
|---|---|
| Starter distillate | 0.35 |
| Citric acid hydrous crystal (dissolved in an equal quantity of water) | 0.36 |

The exact amount of citric acid should be adjusted so as to give a pH of from 4.3 to 4.7. Salt may be added if desired.

The sour cream is then packaged and refrigerated until it is consumed. Sour cream prepared by this method is comparable to cultured sour cream in flavor and appearance, has a uniformly firm body with good spreading consistency, and has an excellent sour cream flavor and aroma. The product has a very low bacterial count usually well below 30,000 bacteria per cc., and has remarkable keeping qualities.

Example 5.—Noncultured sour cream

To 100 pounds of cold raw cream (18% or more fat) add:

| | Pounds |
|---|---|
| Locust bean gum | 0.25 |
| Tapioca flour | 0.75 |
| Distilled monoglycerides | 0.50 |

Premix, and sprinkle slowly into agitated cream at point of greatest agitation.

Allow a few minutes for the stabilizing agents to become dispersed, then heat to 205° F., cool to about 150° to 170° F., homogenize at 1000–3000 pounds pressure, cool to 110° F. or lower and then add:

| | Pounds |
|---|---|
| Lactic acid (85% food grade) | 0.45 |
| Acetic acid | 0.05 |
| Diacetyl | 0.01 |

Adjust the amount of lactic acid so as to obtain a pH of 4.50. Package and hold under refrigeration until consumed. The product will have a remarkably low bacterial count, and have excellent keeping quality.

Example 6.—Noncultured modified sour cream

To 100 pounds of half-and-half (milk-cream, containing about 11.5% fat) there is added:

| | Pounds |
|---|---|
| Distilled monoglycerides | 0.75 |
| Sodium caseinate | 0.50 |
| Guar gum | 0.20 |

Add the distilled monoglycerides, sodium caseinate and guar gum to the cream with vigorous agitation, heat to 175° F. and homogenize at 1000 to 3500 pounds pressure. Cool to below 90° F. and add:

| | | |
|---|---|---|
| Malic acid crystals, dissolved in an equal quantity of water | pound | 0.40 |
| Starter distillate (optional) | do | 0.30 |
| Rennet (optional) | cc | 0.10 |

Adjust the amount of malic acid so as to obtain a pH of 4.30 to 4.70. Package and hold under refrigeration until consumed.

Example 7.—Noncultured cottage cheese

To 100 pounds of skim milk or whole milk (or a mixture thereof) containing from 8.5 to 12.0% of non-fat milk solids, add 0.50 pound gelatin. Disperse the gelatin in the milk and pasteurize in the usual way. Cool the milk to the desired setting temperature of about 65–75° F. Prepare acid, rennet and salt solutions as follows:

Concentrated edible hydrochloric acid, dissolved in
 an equal volume of water, sufficient to adjust pH
 to 4.7 _____pound__ 0.30
Rennet extract (diluted with 10 times its volume of
 water) _____cc__ 0.10
Calcium chloride ($CaCl_2$) (dissolved in 4 times its
 weight of water) _____ounce__ 0.25

Slowly pour the above solution into the cooled milk while it is being agitated, and continue the agitation for several minutes after they have been added to insure their uniform distribution throughout the milk.

Allow the milk to set undisturbed until a firm coagulation is formed. This will require about ½ to 1 hour, depending upon the milk temperature (65°–75° F.). The coagulated milk is then cut into cubes, cooked and drained in the usual manner.

Example 8.—Noncultured sour cream

Commercial coffee cream (18 percent butterfat) was heated to 169° F. and homogenized at 2500 p.s.i. The product was cooled from 169° to about 90–110° F. 0.50% stabilizer was added, consisting of 50% guar gum and 50% salt. The product was then heated to 175° F., then cooled to 60° F. Then 1.5% of an acid solution was added, consisting of 33% by weight of citric acid, 10% by weight of acetic acid, and 10% by weight of propionic acid. The cream was agitated until the acid solution was thoroughly mixed with the cream, and the cream became smooth and free of lumps. The cream was then packaged and stored under refrigeration until consumed.

Example 9.—Noncultured sour cream

The procedure set forth in Example 8 was repeated with the exception that 2.00 percent by weight of stabilizer was added consisting of 10% locust bean gum, 50% monoglycerides, and 40% tapioca flour. The resulting product was very similar in taste and appearance to that of Example 8, except it had a much firmer and heavier body.

The following specific examples serve to illustrate that satisfactory acidified milk products cannot be made with dilute acid solutions.

Fresh Florida orange juice which had a pH of 3.58 and an acidity of 0.746 percent (calculated as citric acid) and Genessee Valley (3:1) concentrated orange juice which had a pH of 3.67 were added to whole milk to lower its pH. The juice and concentrate were each added to milk specimens in ratios of juice to milk of 1:5, 1:4, 1:3, and 1:2. The specimens were then checked for pH. The results are set forth in the table below:

THE pH OF ORANGE JUICE AND MILK DILUTIONS

| | Dilution Rates (Parts Orange Juice to Parts Milk by Volume) | | | |
|---|---|---|---|---|
| | 1:5/5.70 | 1:4/5.42 | 1:3/5.25 | 1:2/4.40 |
| Florida Orange Juice | | | | |
| Genessee Valley Concentrate | 4.45 | 4.27 | 4.25 | 4.21 |

None of the specimens exhibited curdling or casein coagulation. From these tests it is readily seen that when adding a mild acid solution such as a fruit juice to milk, even in a relatively concentrated form, the acidity of the fruit juice is so weak that the large amount of nonacid liquid solution dilutes the milk to such an extent that the tendency to coagulate is greatly reduced.

All of the above acid (fruit juice) additions contributed such excessive quantities of water to the milk that even if coagulation had occurred it would not have been a marketable product.

In the description of the present specification and particularly the claims, the term "milk" is used in its generic sense to mean whole milk, skim milk, cream, or milk of any butterfat content, either the fresh fluid product, or reconstituted condensed milk, or milk powder.

It will be understood that the colloid forming additions (stabilizer) of the present invention include all materials that will form a colloidal suspension when added to milk and which are not deleterious to human consumption in the quantities employed. Such colloids consist of a state of subdivision of matter characterized by a particle size intermediate between molecule dispersion and about 300µ.

While, in the foregoing, specific embodiments of the invention have been set forth in considerable detail for purposes of illustration, it will be understood by those skilled in the art that many of these details may be varied without departing from the spirit and scope of the invention.

What is claimed is:
1. A process for making acidified milk products comprising:
 (a) mixing a colloid-forming stabilizer with milk in amounts of from about 0.05 percent to 1.0 percent, by weight, said colloid-forming stabilizer consisting of at least one material selected from the group consisting of gelatin, casein, flour, tapioca flour, increased nonfat milk solids, agar, locust bean gum, guar gum, cellulose gum, carrageenan, gum tragacanth, gum arabic, Danish agar, water-dispersible lecithin and gelatin hydrolyzate; and
 (b) mixing an edible acid with said milk in amounts disposed to effect casein coagulation, said acid being of a concentration to constitute no more than about 5 percent, by weight, of the milk.
2. The process of claim 1 wherein said colloid-forming stabilizer consists of at least one material selected from the group consisting of guar gum, locust bean gum, agar, casein, gelatin, carrageenan, gelatin hydrolyzate, gum tragacanth, cellulose gum, and water-dispersible lecithin.
3. The process of claim 2 wherein said milk is a high butterfat milk or cream and the product is sour cream.

References Cited

UNITED STATES PATENTS

| 607,363 | 7/1898 | Graeff | 99—79 X |
| 1,661,601 | 3/1928 | Dahlberg | 99—116 |
| 1,815,727 | 7/1931 | Reynolds et al. | 99—59 X |
| 2,853,386 | 9/1958 | Hughes | 99—54 |
| 2,956,885 | 10/1960 | Roundy et al. | 99—116 |
| 2,982,654 | 5/1961 | Hammond et al. | 99—116 |

FOREIGN PATENTS 677,531  8/1952  Great Britain.

OTHER REFERENCES

Kertesz, A. I., "The Pectic Substances," 1951, Interscience Publ. Inc., N.Y., TP 248 p4 K4, pp. 556–557.

MAURICE W. GREENSTEIN, *Primary Examiner.*

A. LOUIS MONACELL, *Examiner.*

UNITED STATES PATENT OFFICE
CERTIFICATE OF CORRECTION

Patent No. 3,378,375                      April 16, 1968

Lawrence L. Little

It is certified that error appears in the above identified patent and that said Letters Patent are hereby corrected as shown below:

Column 2, line 8, "abcteria" should read -- bacteria --. Column 5, line 72, after "does" insert -- not --. Column 8, line 12, "stirrer" should read -- starter --.

Signed and sealed this 16th day of September 1969.

(SEAL)
Attest:

Edward M. Fletcher, Jr.                  WILLIAM E. SCHUYLER, JR.
Attesting Officer                         Commissioner of Patents